United States Patent [19]
Bieler et al.

[11] 3,811,870
[45] May 21, 1974

[54] BASIC OXYGEN PROCESS USING A SODIUM HYDROXIDE REACTION PRODUCT FLUX

[75] Inventors: Barrie H. Bieler; David C. Morgan; Kenneth W. Guebert, all of Midland, Mich.

[73] Assignee: The Dow Chemical Company, Midland, Mich.

[22] Filed: Dec. 10, 1971

[21] Appl. No.: 206,882

[52] U.S. Cl. .................................. 75/52, 75/94
[51] Int. Cl. ............................................ C21c 7/00
[58] Field of Search ............. 75/30, 43, 94, 55, 52

[56] References Cited
UNITED STATES PATENTS

| | | | |
|---|---|---|---|
| 3,288,592 | 11/1966 | Tadsen et al. | 75/52 |
| 3,721,547 | 3/1973 | Dvorak et al. | 75/30 |
| 3,309,196 | 3/1967 | Kaneko et al. | 75/94 |
| 2,577,883 | 12/1951 | Fourmanoit | 75/55 |
| 3,630,673 | 12/1971 | Mod et al. | 423/593 |
| 3,351,460 | 11/1967 | Demaison | 75/60 |
| 2,085,565 | 6/1937 | Andrews | 75/55 |
| 1,590,739 | 6/1926 | Evans | 75/55 |
| 3,131,053 | 4/1964 | Grebe et al. | 75/30 |

OTHER PUBLICATIONS

The Making Shaping & Treating of Steel, 8th Ed., 1964, (pp. 453–455 relied on) TN730C16.
Handbook of Cupola Operation; 1st Ed.; Amer. Foundrymen's Assn.; 1946; pp. 316–319.

*Primary Examiner*—L. DeWayne Rutledge
*Assistant Examiner*—M. J. Andrews
*Attorney, Agent, or Firm*—William M. Yates; S. S. Grace; L. S. Jowanovitz

[57] ABSTRACT

In the manufacture of steel wherein sodium hydroxide is employed as an additive in such manufacture, the improvement of using a reaction product of sodium hydroxide and a calcium oxide source material as the source of sodium hydroxide. A particular instance is the use of this reaction product as an additive to a calcium oxide based flux.

19 Claims, No Drawings

BASIC OXYGEN PROCESS USING A SODIUM HYDROXIDE REACTION PRODUCT FLUX

BACKGROUND OF THE INVENTION

Current steel-making practice utilizes several systems, but primarily open hearth, electric or basic oxygen furnaces. Equipment for these systems is generally constructed of a steel shell with an inner lining of refractory material. Although these systems can employ acidic type refractories, e.g. silicate base brick, conventionally, basic refractories are being used, e.g. MgO or burned dolomite base brick.

In general, the steel-making process comprises subjecting blast furnace iron and/or iron scrap to a blast of oxygen at elevated temperatures in one of the above mentioned systems. The process produces molten steel relatively free of impurities, e.g. carbon, manganese, phosphorus, sulfur and silicon. A flux is used to capture or collect some of these impurities. Where the refractory lining is basic, the flux and slag that form should also be basic to avoid corrosion of the refractories by the flux or slag. A calcium oxide base slag is commonly employed (U.S. Pat. No. 3,288,592). For example, calcium carbonate, calcium oxide and/or dolomite is added to the system to produce a molten slag cover over the molten steel. The Ca reacts with the acidic $SiO_2$ impurity burned out of the molten iron to form calcium silicates.

It has been suggested that NaOH be added to the steel making process, e.g. to lower the flux melting point or produce a useable glass slag (U.S. Pat. No. 3,131,053).

A primary object of the present invention is to provide an effective method of introducing NaOH in steel-making operations.

Another object of the present invention is to provide a method for at least partial replacement of the $CaF_2$ additive to the CaO base flux used in steel manufacture.

THE INVENTION

The present invention comprises adding sodium hydroxide (NaOH) in a steel making process in the form of a reaction product of NaOH with a calcium oxide source material. The NaOH is thereby chemically held in the reaction product and consequently the tendency to volatilize in the steel-making process is reduced since it is no longer in the free, uncombined state.

The term "calcium oxide source material," as used herein, refers to any material containing CaO, such as limestone, lime, slaked lime, dolime, dolomite or slaked dolime.

The terms "reaction product" or "reaction product of sodium hydroxide with calcium oxide source material," as used herein, refer to any of several products prepared by reacting an aqueous solution of sodium hydroxide with a calcium oxide source material at a temperature within the range of from 60° C up to the melting point of the sodium hydroxide. The sodium hydroxide solution is normally greater than 50 wt. % NaOH. The ratio of the reactants is usually within the range of from about 2 to about 6 moles of NaOH per mole of calcium oxide source material. A reaction takes place which causes the mixture to set up or harden and an exotherm is observed. As the temperature of reaction increases, the time for reaction decreases. For example, at 140° C the time for reaction is on the order of a few minutes. Examples of such reaction product are disclosed in U.S. Pat. 3,630,673. The reaction product so produced can be granulated or particulated and mixed in as a separate component in the steel-making process.

In the practice of the present invention where the reaction product is used as a flux additive, it can be employed in varying ratios with the normal flux (CaO or calcium oxide source material). Preferably the reaction product is added in an amount of from about 2 to about 15 weight per cent of the total weight of the flux. It is well within the ability of those skilled in the steel-making art to determine the optimum amount and ratio of reaction product additive to calcium oxide of the flux for a particular system, and given operating conditions.

The present invention introduces NaOH into the CaO flux of a basic steel making system in an effective, relatively simple manner. The reaction product places the NaOH in a chemical combined state, permitting the NaOH to act as an effective flux component to the calcic slag.

PREFERRED EMBODIMENTS

A particular system used in steel-making is the basic oxygen furnace (BOF). In its operation the basic brick lined furnace is loaded with steel scrap and blast furnace hot metal. An oxygen lance is lowered close to the hot ($\approx$2500° F) metal surface. Oxygen is then blown on the metal to start ignition of the carbon and silicon in the melt. Conventionally CaO is introduced into the furance to form the basic slag. Fluorspar ($CaF_2$) may also be added to control the slag viscosity. The oxygen blow continues for several minutes. The melt is then poured into a ladle and thence into ingot molds at a temperature of about 2,950° F.

In accordance with the present invention solid reaction product is added to the CaO and introduced with it into the BOF. This will, among other things, lower the melting point of the flux and allow the slag to function earlier. For example, the beginning of melting for metallurgical grade CaO as compared to 90% metallurgical grade CaO — 10% reaction product was found to be:

| | |
|---|---|
| CaO | 1200°C |
| 90% CaO – 10% R.P. | 1170°C |

The NaOH-calcium oxide reaction product can be similarly added to any CaO flux used in a steel making system employing a basic refractory lined furnace.

EXAMPLES

Samples of a NaOH-CaO reaction product were prepared by admixing particulate calcium oxide and 73 weight per cent aqueous sodium hydroxide solution preheated to 160° C in a pony mixer. The mole ratio of NaOH to CaO was about 5:1. Reaction, as evidenced by the occurrence of an exotherm, took place within a matter of minutes. The reaction product was dried overnight in an oven at 200° C and particulated. Analysis of the product confirmed a NaOH/CaO mole ratio of about 5:1.

A sample of the reaction product was admixed with a calcium oxide flux to yield a 90% flux, 10% reaction product. The mixture was placed in a furnace, maintained at a temperature of 1,475° C (2,687° F) for 25 minutes. Analysis of the resulting flux mixture showed essentially no loss of the reaction product, indicating the good stability of the present additive. On the other hand, when $CaF_2$ was used as the 10% additive instead of the reaction product, analysis of the resulting flux indicated that some 15% of the $CaF_2$ had been lost.

To determine the effect of the reaction product on MgO basic refractory brick, samples of commercially used, tar impregnated, high magnesite brick (with the tar burned out to represent the inside surface of a BOF) were placed into a molten flux at 1,500° C (2,732° F). A sample of the brick was placed in a straight CaO flux, a 90% CaO—10% R.P. flux and a 90% CaO—10% $CaF_2$ flux. After 25 minutes the samples were removed from the furnace, cooled and sectioned. Attack on the refractory was visually observed. The results were:

| | |
|---|---|
| CaO | no attack |
| 90% CaO–10% reaction product | little or no attack |
| 90% CaO–10% $CaF_2$ | substantial attack (brick disintegrated) |

This indicates that the reaction product additive will cause substantially less damage to refractory linings than the conventional lime based flux containing fluorspar.

What is claimed is:

1. In a process of making steel by the basic oxygen process using a flux containing sodium hydroxide, the improvement comprising using a particulate reaction product as the only source of the sodium hydroxide, the reaction product being formed by mixing together an aqueous solution of sodium hydroxide and a calcium oxide source material, maintaining contact between the sodium hydroxide and calcium oxide source material for a sufficient time and at a temperature sufficient to form the reaction product, and forming a particulate of the reaction product.

2. The improvement of claim 1 wherein the steel making process is carried out in a furnace having a basic refractory lining containing MgO.

3. The improvement of claim 1 wherein the reaction product is formed by maintaining contact between the sodium hydroxide and calcium oxide source material at a temperature of from about 60° C. up to the melting point of sodium hydroxide.

4. The improvement of claim 1 wherein the aqueous sodium hydroxide is greater than 50 weight percent NaOH.

5. The improvement of claim 1 wherein the reaction product is added to the steel making process in an amount of from about 2 to about 15 weight percent of the total flux.

6. The improvement of claim 1 wherein the molar ratio of the sodium hydroxide and the calcium oxide source material mixed together to form the reaction product is from about 2 to about 6:1.

7. The improvement of claim 6 wherein the aqueous sodium hydroxide is greater than .50 weight percent NaOH.

8. The improvement of claim 6 wherein the reaction product is added to the steel making process in an amount of from about 2 to about 15 weight percent of the total flux.

9. The improvement of claim 1 including adding the reaction product to a calcium oxide base flux in the steel making process.

10. The improvement of claim 9 wherein the steel making process is carried out in a furnace having a basic refractory lining containing MgO.

11. The improvement of claim 9 wherein the calcium oxide base flux in the steel making process contains calcium fluoride and the reaction product is employed as at least a partial replacement for said calcium fluoride.

12. The improvement of claim 11 wherein the reaction product is added to the steel making process in an amount of from about 2 to about 15 weight percent of the total flux.

13. The improvement of claim 1 wherein the calcium oxide source material is CaO.

14. The improvement of claim 13 wherein the reaction product is added to the steel making process in an amount of from about 2 to about 15 weight percent of the total flux.

15. The improvement of claim 13 including adding the reaction product to a calcium oxide base flux in the steel making process 16. The improvement of claim 15 wherein the calcium oxide base flux in the steel making process contains calcium fluoride and the reaction product is employed as at least a partial replacement for said calcium fluoride.

17. The improvement of claim 13 wherein the molar ratio of the sodium hydroxide and the calcium oxide source material mixed together to form the reaction product is from about 2 to about 6:1.

18. The improvement of claim 17 wherein the aqueous sodium hydroxide is greater than 50 weight percent NaOH.

19. The improvement of claim 17 wherein the reaction product is formed by maintaining contact between the sodium hydroxide and calcium oxide source material at a temperature of from about 60° C. up to the melting point of sodium hydroxide.

* * * * *

UNITED STATES PATENT OFFICE
CERTIFICATE OF CORRECTION

Patent No. 3,811,870　　　　　　Dated May 21, 1974

Inventor(s) Barrie H. Bieler; David C. Morgan; Kenneth W. Guebert

It is certified that error appears in the above-identified patent and that said Letters Patent are hereby corrected as shown below:

In Column 1, line 59, before the phrase "60°C," insert --about--.

In Column 4, line 4, delete the decimal point "." immediately before the number "50".

Signed and sealed this 1st day of October 1974.

(SEAL)
Attest:

McCOY M. GIBSON JR.　　　　　　C. MARSHALL DANN
Attesting Officer　　　　　　　Commissioner of Patents